(12) United States Patent
Brochu et al.

(10) Patent No.: US 7,271,508 B2
(45) Date of Patent: Sep. 18, 2007

(54) METHOD FOR DEICING ENERGIZED ELECTRICAL TRANSMISSION LINES

(75) Inventors: Jacques Brochu, Boucherville (CA); André Bergeron, Jonquiere (CA); Rene Cloutier, Chicoutimi (CA)

(73) Assignee: CITEQ, Quebec (CA)

( * ) Notice: Subject to any disclaimer, the term of this patent is extended or adjusted under 35 U.S.C. 154(b) by 0 days.

(21) Appl. No.: 10/529,696

(22) PCT Filed: Oct. 1, 2003

(86) PCT No.: PCT/CA03/01488

§ 371 (c)(1),
(2), (4) Date: Mar. 28, 2005

(87) PCT Pub. No.: WO2004/032300

PCT Pub. Date: Apr. 15, 2004

(65) Prior Publication Data

US 2006/0138870 A1    Jun. 29, 2006

(30) Foreign Application Priority Data

Oct. 3, 2002  (CA) ................................. 2406368

(51) Int. Cl.
*H02G 7/16* (2006.01)
(52) U.S. Cl. ..................... 307/147; 219/636
(58) Field of Classification Search ................ 307/116
See application file for complete search history.

(56) References Cited

U.S. PATENT DOCUMENTS

| | | | |
|---|---|---|---|
| 4,082,962 A | 4/1978 | Burgsdorf et al. | |
| 4,085,338 A | 4/1978 | Genrikh et al. | |
| 4,126,792 A | 11/1978 | Genrikh et al. | |
| 4,368,499 A * | 1/1983 | Stifter ........................ | 361/90 |
| 5,907,239 A * | 5/1999 | Pelletier et al. ............. | 323/361 |
| 6,396,172 B1 * | 5/2002 | Couture ...................... | 307/125 |
| 6,433,520 B1 * | 8/2002 | Schauder .................... | 323/207 |

FOREIGN PATENT DOCUMENTS

| | | | |
|---|---|---|---|
| FR | 2745430 | * | 8/1997 |
| GB | 850 612 | | 10/1960 |

OTHER PUBLICATIONS

Chishinau, "Phase-Shifting Transformer TDNCF-6300-110/110", Universitat, 1991.*

(Continued)

*Primary Examiner*—Brian Sircus
*Assistant Examiner*—Adi Amrany
(74) *Attorney, Agent, or Firm*—Darby & Darby

(57) ABSTRACT

The invention concerns a method for deicing energized electrical transmission lines by means of an apparatus capable of producing an angular offset between its terminals. The method consists in: selecting segments (4, 6) of electrical transmission lines to de deiced, connecting the segments (4, 6) so as to form a loop, connecting the apparatus in series with the segments (4, 6) of the loop to be deiced. In the case of an apparatus with adjustable angular offset, it consists in switching on the apparatus and adjusting the angular offset to impose an increase of current flowing in at least one of the segments (4, 6) as the case may be. In the case of a apparatus with fixed angular offset, it consists in using a switch (54) or a circuit breaker (28) so as to connect the apparatus in the loop, the apparatus and the line segments being previously selected such that the angular offset imposes the required current increase to the deicing of at least one of the segments (4, 6) of the loop.

13 Claims, 12 Drawing Sheets

OTHER PUBLICATIONS

Chiorsac, et al, "A Phase Shifting Controlled Series Compensation for HV Transmission Systems", Very High Voltage Networks Symposium, Sibiu, Romania, 1995, pp. 90-93.*

The Application of Phase-Shifting Transformers to the Power Line Ice Melting, L.P. Kalinin and V.A. Soldatov, 5th International Workshop on Atmospheric Icing of Structures (IWAIS '90), Oct. 29-Nov. 1, Tokyo, Japan.

* cited by examiner

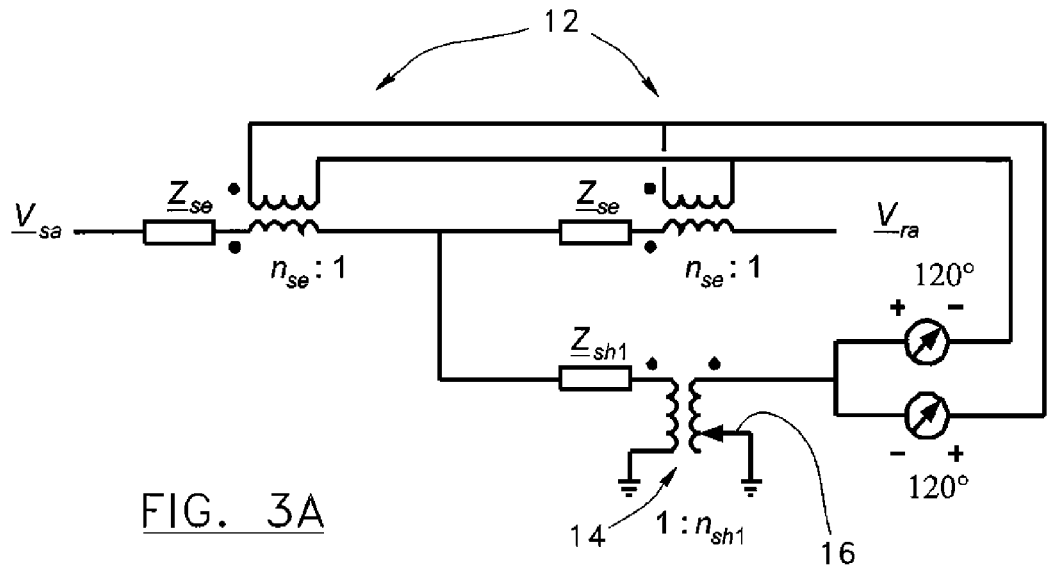
FIG. 3A
FIG. 3B
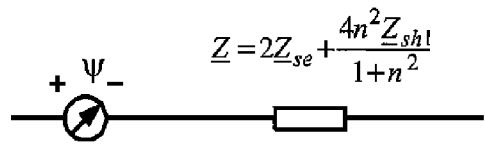
$$\underline{Z} = 2\underline{Z}_{se} + \frac{4n^2 \underline{Z}_{sh1}}{1+n^2}$$
FIG. 3C
$$\underline{Z}_0 = 2\underline{Z}_{se}$$

|  | INTERNAL ANGLE $\psi$ (DEGREES) | EXTERNAL ANGLE $\delta_{sr}$ (DEGREES) | $S_r$ POWER OF THE PST (MVA) | $S_r$ POWER OF THE APST (MVA) |
|---|---|---|---|---|
| PST ONLY | 60 | 60,9 | 142 | n. a. |
|  | 50 | 48,8 | 153 |  |
|  | -32 | -30,5 | 186 |  |
|  | 60 | 57,0 | 251 |  |
|  | 30 | 27,5 | 272 |  |
| PST IN ASSISTED MODE | 53 | 49,8 | 266 | 812 |
|  | 43 | 37,9 | 443 | 842 |

FIG. 16

METHOD FOR DEICING ENERGIZED ELECTRICAL TRANSMISSION LINES

FIELD OF THE INVENTION

The invention generally pertains to the de-icing of electrical lines, and more particularly to a method of de-icing energized electrical lines by means of an apparatus capable of producing an angular offset between its terminals.

BACKGROUND OF THE INVENTION

U.S. Pat. No. 4,082,962 (Burgsdorf et al.), U.S. Pat. No. 4,085,338 (Genrikh et al.) and U.S. Pat. No. 4,126,792 (Genrikh et al.) describe apparatus and systems for de-icing high voltage grids and power transmission lines by flowing a continuous current obtained using a rectifier circuit. The lines to be de-iced must be temporarily put out of service in order to perform the de-icing operation. In certain cases, supplementary devices must be added to the grid before being able to perform a de-icing operation, such a device being for example a circuit for grounding the lines to be de-iced.

SUMMARY OF THE INVENTION

An objective of the present invention is to propose a method for de-icing energized electrical lines, for example in a substation in an alternating transmission grid or in a substation, or along a line, in an alternating distribution grid.

Another objective of the present invention is to propose a method for de-icing that presents the qualities required for solving the problem of ice rain in regions affected by this type of precipitation.

The present invention concerns a method for de-icing energized electrical lines by circulating an alternating current by means of an apparatus capable of producing an angular offset adjustable between its terminals, comprising:

selecting segments of electrical lines to be de-iced;

connecting the segments so as to form a loop;

connecting the apparatus in series with the segments of the loop to be de-iced;

activating the apparatus; and adjusting the angular offset of the apparatus to impose an increase of current flowing in at least one of the segments of the loop, thus causing the de-icing of said at least one of the segments of the loop.

The present invention also concerns a method for de-icing energized electrical lines by means of an apparatus capable of producing a fixed angular offset between its terminals, comprising:

selecting segments of electrical lines to be de-iced;

connecting the segments so as to form a loop;

connecting the apparatus in series with the segments of the loop to be de-iced;

activating the apparatus; and connecting the apparatus in circuit with the loop, the apparatus and the line segments being previously chosen so that the angular offset imposes an increase in current flowing in at least one of the segments of the loop, thus causing the de-icing of said at least one of the segments of the loop.

BRIEF DESCRIPTION OF THE DRAWINGS

A detailed description of the preferred embodiments of the invention will be presented hereafter with reference to the following drawings, in which the same reference numbers refer to identical or similar elements in each drawing:

FIGS. 3A-C are schematic diagrams equivalent of a phase shifting transformer where (A) represents the direct sequence circuit, (B) represents the direct sequence circuit under load flow conditions and (C) represents the short-circuited zero sequence circuit.

FIG. 16 is a table of the characteristic power angle of a phase shifting transformer, according to the present invention.

DETAILED DESCRIPTION OF PREFERRED EMBODIMENTS

The apparatus according to the invention enables preventative and corrective de-icing of lines in which the rated voltages are situated typically, but not restrictively, from 25 to 315 kV. For this reason, the apparatus can be called an On-load Network De-Icer (hereafter referred to as ONDI).

The ONDI imposes an alternating current flow in the circuits of the lines looped between them for heating the conductors by the Joule effect. It can be embodied by classic and proven technologies such as phase shifting transformer (PST), capacitor, and circuit breaker. Its activation and exploitation can be achieved by maneuvering nothing but the circuit breakers (no disconnecting switch), which renders it unaffected by ice rain. We can therefore, by remote control, successively connect a plurality of lines of a target region to the ONDI without any interruption of the charge, thus where it gets its name. The most strategic and critical lines can be heated before and during an ice storm in order to prevent the formation of ice.

The economic justification of the ONDI at certain substations uniquely depends on its use as a de-icer. It is always important to emphasize that it is possible that in other regions, its ability to control power flow or other parameters of the grid can be profited from throughout the year.

The term ONDI is used for referring to the function of the apparatus rather than the technology employed for realizing it. Depending on the lines to be de-iced, we see that the ONDI can be constituted by a PST only or a PST in parallel with a capacitor. We can say that the PST is "assisted" when it is used in combination with a capacitor. An APST (Assisted Phase shifting Transformer) acts as a PST with regards to the transmission of active power.

Besides the PST (Phase Shifting Transformer) and the APST (Assisted Phase Shifting Transformer), other devices may be used for applying an alternating voltage in series with the lines to be de-iced. For example, a FACTS apparatus (Flexible AC Transmission System) like the SCCC (Static Synchronous Series Compensator) could be considered where rapid regulation of the load flow would be useful apart from periods of ice rain. We can also extend the technique of de-icing by current flow to other voltage levels than those considered here.

Figure 1A:
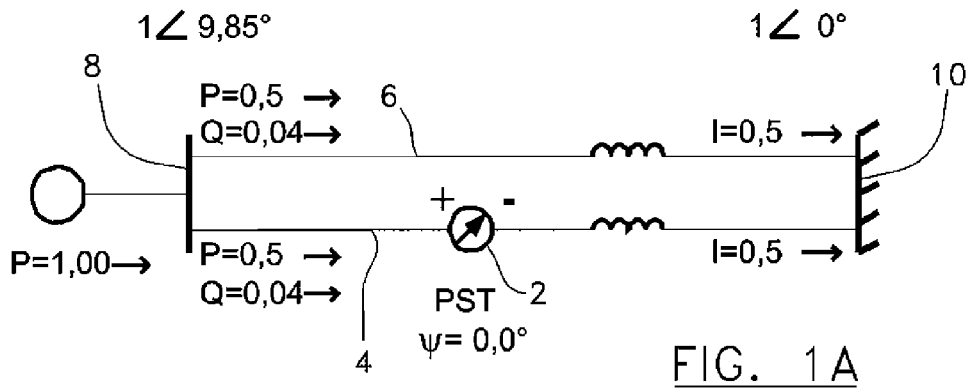
FIGS. 1A-C are schematic diagrams showing the effect of the phase shifting transformer on alternating current flow in electrical lines to be de-iced, at different operation points, in accordance with the present invention.
Figure 1B:
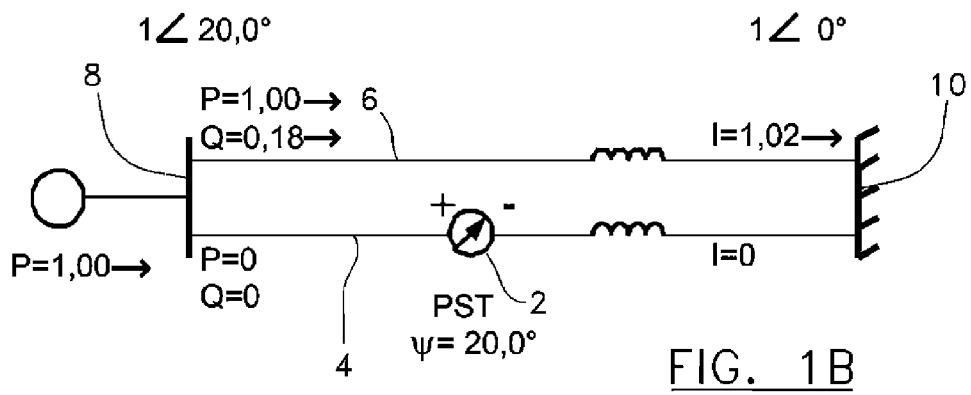
Figure 1C:
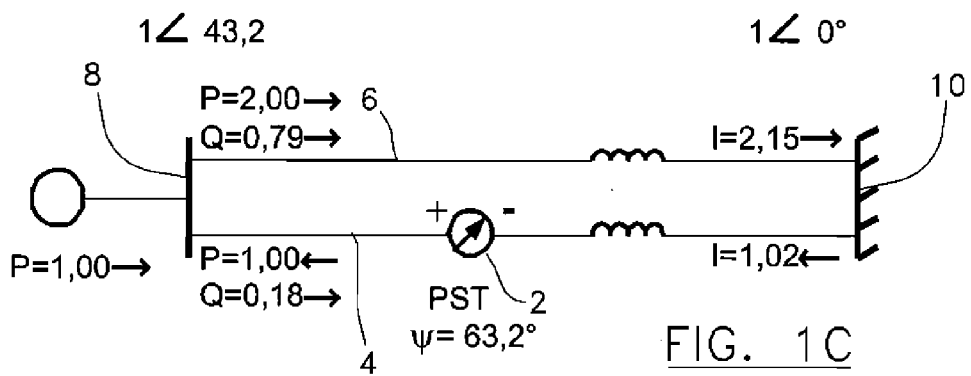

FIGS. 1A-C provide three examples illustrating the working principle of de-icing by current flow. Shown is the effect of a PST 2 in an elementary grid comprising two lines 4, 6 that are parallel and connect a generation bus 8 to a swing bus 10. For simplification reasons, the PST 2 is assumed to be ideal (without leak impedance) and the lines 4,6 are assumed to have no losses.

In the first case illustrated in FIG. 1A, the PST 2 imposes at its terminals an angular offset $\psi$ equal to zero in such a way that the power P of the source is transported in equal parts by the two lines 4,6 towards the swing bus 10.

In the second example illustrated in FIG. 1B, the angular offset $\psi$ of the PST 2 is chosen so that the current I in the line 4 is reduced to zero. We note that the angular offset $\psi$ of the PST 2 is in fact equal to the angle appearing at the terminals of the two lines; there is therefore no angular displacement at the terminals of line 4 in series with the PST 2, which forces the current of the latter to become zero. This effect can also be interpreted as being due to the flow of current of −0.5 pu (per unit), which cancels the current of 0.5 pu in line 4 where the PST 2 is found, and increases the current in the other line 6 to slightly more than 1.0 pu.

We thus obtain a concentration of all the charging current in only one (6) of the two lines 4,6. In terms of the active power flow, this situation is equivalent to cancelling line 4 where the PST 2 is found. In terms of operational reliability, the concentration of charging current by means of the PST 2 is however better because the two lines 4,6 remain in operation.

In a third case, such as illustrated in FIG. 1C, we can see an example where we have chosen to force a current I of 1.02 pu into line 4 in series with the PST 2. The current I goes from the infinite bus 10 towards the generation bus 8. We may note that this current is of equal amplitude but different signs from the current obtained in the second case (FIG. 1B). In relation to the initial case (FIG. 1A), the line 6 that is to be de-iced holds a current four times greater. It is such an elevated current flow that enables the heating and de-icing of the conductors by the Joule effect.

This last case draws our attention to a particularity of de-icing by current flow. By modifying the angles of the grid, the PST 2 acts directly on the active power flows. In the last case (FIG. 1C), we will thus note that the current of 1.02 pu that flows in line 4 in series with PST 2 is translated by an active power wheeling of 1.0 pu just as for the current of 1.02 pu obtained in line 6 of the second case (FIG. 1B). The flowing current associated with the effect of the PST 2 is therefore principally active rather than reactive.

PSTs are used to modify the power flows in the lines suffering from abnormal angular displacements at their terminals. After instalment, they are used in series with the transport lines for increasing (boost) or decreasing (buck) the wheeled power. There are currently about one hundred PSTs in North America.

There are many suitable PST topologies depending on the voltage level where they are needed and the operating conditions foreseen at their terminals.

Figure 2A:
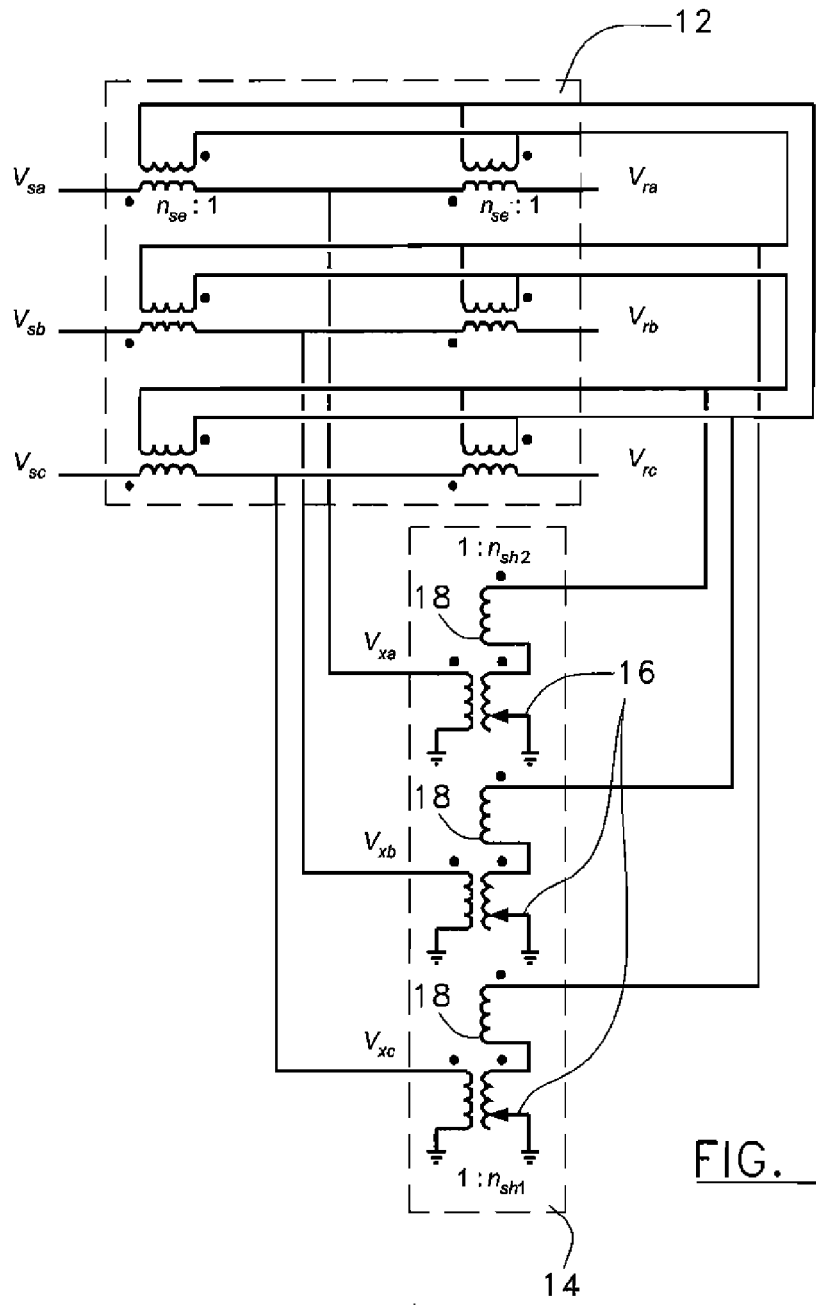
FIGS. 2A-B are respectively a schematic diagram of a two core phase shifting transformer able to be used in accordance with the invention, and a diagram of the corresponding phase inverters.
Figure 2B:
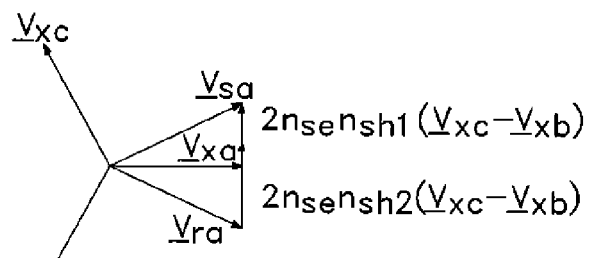

Referring to FIGS. 2A-B, a Mersereau type PST is probably the most appropriate type for an installation at 315 kV whereas a squashed-delta or hexagonal-delta (not illustrated) type PST are best suited for de-icing at 25 kV. FIG. 2A gives an example of a Mersereau connection set-up. This type of PST is made up of two cores (transformers) 12, 14 that can be kept in a same physical housing or not. The Merserau type PST can be for independently acting on the angular offset and on the voltage amplitude at its terminals. In the case shown here, the PST does not allow for angular displacement modifications.

The operating principle of this PST is simple. The shunt transformer (excitation) 14 is fed by a system of triphase voltages withdrawn from the middle point of the series transformer 12. At the secondary section of the shunt transformer 14, we provide a tap changer 16 that enables the variation of the voltage value applied to the series transformer 12. It is notable that the voltage that is at the secondary section to phase A of the shunt transformer 14 is not applied directly to the phase A of the series transformer 12. In effect, the phase A of the series transformer 12, is rather fed by the voltage difference between phases C and B of the shunt transformer 14. As shown on the schematic of phase shifters illustrated in FIG. 2B, this difference in voltage Vxc-Vxb is in quadrature with the voltage Vxa at the middle point of the series transformer 12. By acting on the tap changer 16, the amplitude of the injected voltage and, at the same time, the angular offset between the voltages Vs and Vr can be varied.

The more the voltage injected in the loop of lines is significant, the more the de-icing current flowing in this loop increases. The tap changer 16 thus enables the supple and gradual regulation of the de-icing current. This flexibility in its regulation enables increasing the de-icing current without suddenly perturbing the voltage in the grid. Moreover, the current can be increased to the required level for de-icing the lines without harming said lines or the equipment in series with said lines.

It is notable on FIG. 2A that the shunt transformer 14 has an additional winding 18 in series with the winding of the tap changers 16. This winding 18 enables the creation of a fixed angular offset that is added or retracted to that produced by the winding of the tap changer 16. This type of winding is added to the PST when significantly large angular offsets are desired, as may be the case for de-icing long lines. For reasons of simplification, the detailed schematic of the tap changer 16 has been omitted, as has been the schematic of the interrupters (not illustrated) required for the insertion and inversion of the winding of the tap changer 16 and the additional winding 18.

With reference to FIG. 3A, a simplified equivalent schematic of the PST for direct sequencing is presented. As illustrated, the additional winding 18 of FIG. 2A of the shunt transformer 14 was deactivated. For reasons of simplification, the series transformer 12 has also been represented as if it was composed of two cores, rather than only one. Following these simplifications, the equivalent schematics of FIGS. 3B and 3C required for studies under load flow conditions (FIG. 3B) and short-circuit studies (FIG. 3C), were obtained. The leak impedance of the PST varies with the position of the tap changers. The impedances Zse and Zsh1 can be calculated in order to reproduce the behaviour of the PST. The impedances $\underline{Z}$, $\underline{Z}_0$ and the ratio n of this phase shifting transformer are given by:

$$\underline{Z} = 2\underline{Z}_{se} + \frac{4n^2 \underline{Z}_{sh1}}{1+n^2};$$

$$\underline{Z}_0 = 2\underline{Z}_{se}; \text{ and}$$

$$n = \sqrt{3}\, n_{se} n_{sh1} = -tg\left(\frac{\psi}{2}\right).$$

Figure 4:
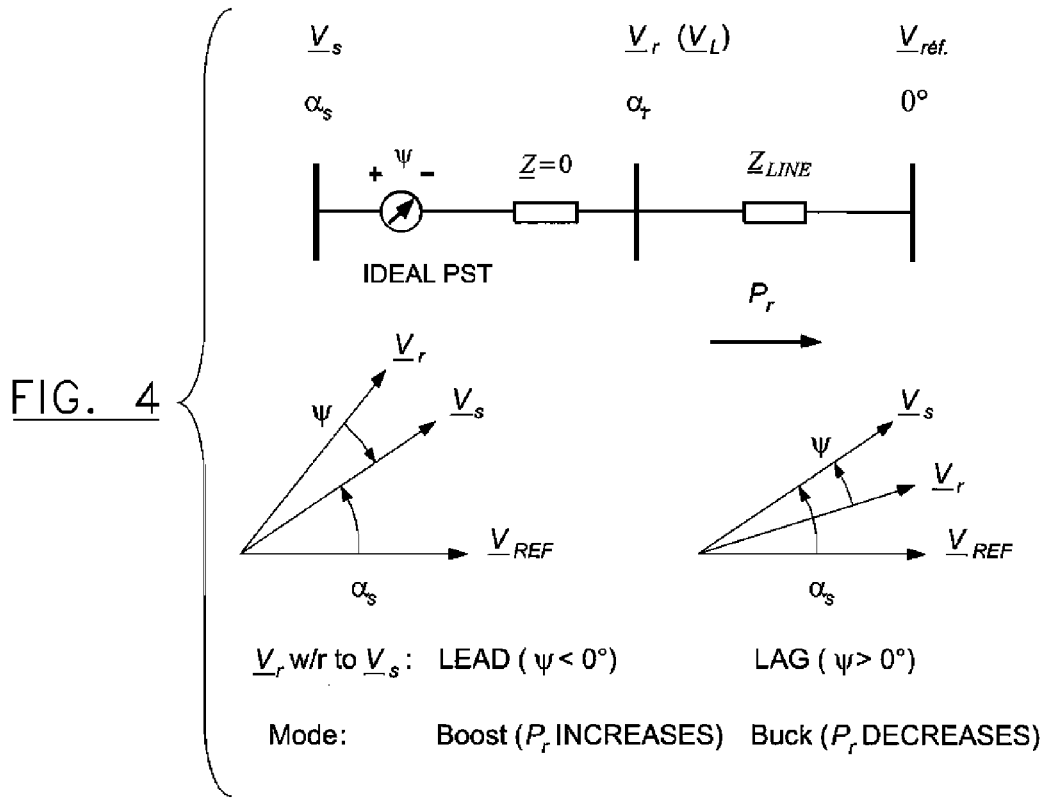
FIG. 4 is a schematic diagram showing modes of use of the phase shifting transformers and the sign convention used herein.

FIG. 4 clarifies the sign convention used here for the internal angle $\psi$ of the PST.

The intephase power controller (IPC) technology has given birth to three devices that have been commercialized by the company ABB: the decoupling interconnector (DI), the fault current limiting transformer (FCLT) and the assisted phase shifting transformer (APST). A PST has been in service at the Plattsburgh, N.Y. substation since June 1998.

The APST constitutes an IRP reduced to its simplest expression.

Figure 5:
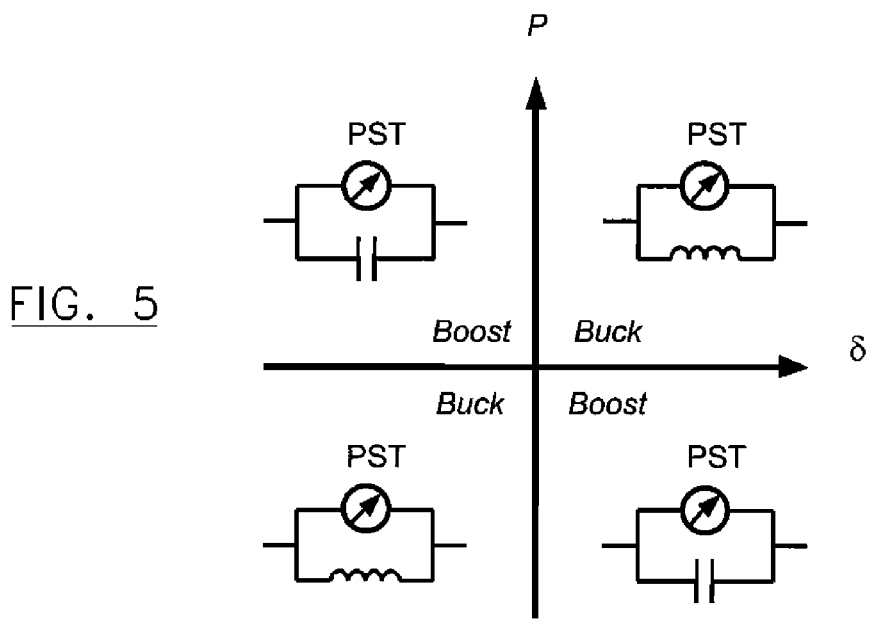
FIG. 5 is a schematic diagram showing the type of assisted phase shifting transformer to be use in accordance with its mode of operation.

Referring to FIG. 5, it can take two forms following that the APST is used for increasing (boost) or decreasing (buck) the wheeled power in the line with which it is in series. For increasing the wheeling, a capacitor is simply installed at the terminals of a PST, whereas inductance is use to reduce wheeling. The axes of the plane of FIG. 5 correspond to the power P wheeled by the PST and to the angle δ present at its terminals. In the present case, the PST is assumed to be ideal and the angle δ is equal to its internal angle $\psi$. In the case of a real PST, δ and $\psi$ are not equal to each other when there is no current in the PST. This system of axes is called a power regulator power-angle plane.

The APST of the Plattsburgh substation was realised by adding an inductance in parallel with an existing APST. In the case of de-icing by current flow, one would rather resort to installing a capacitor in parallel with a PST. This reactive element enables the wheeling level in the line to be increased to a higher level than could be achieved using only the PST.

Figure 6:
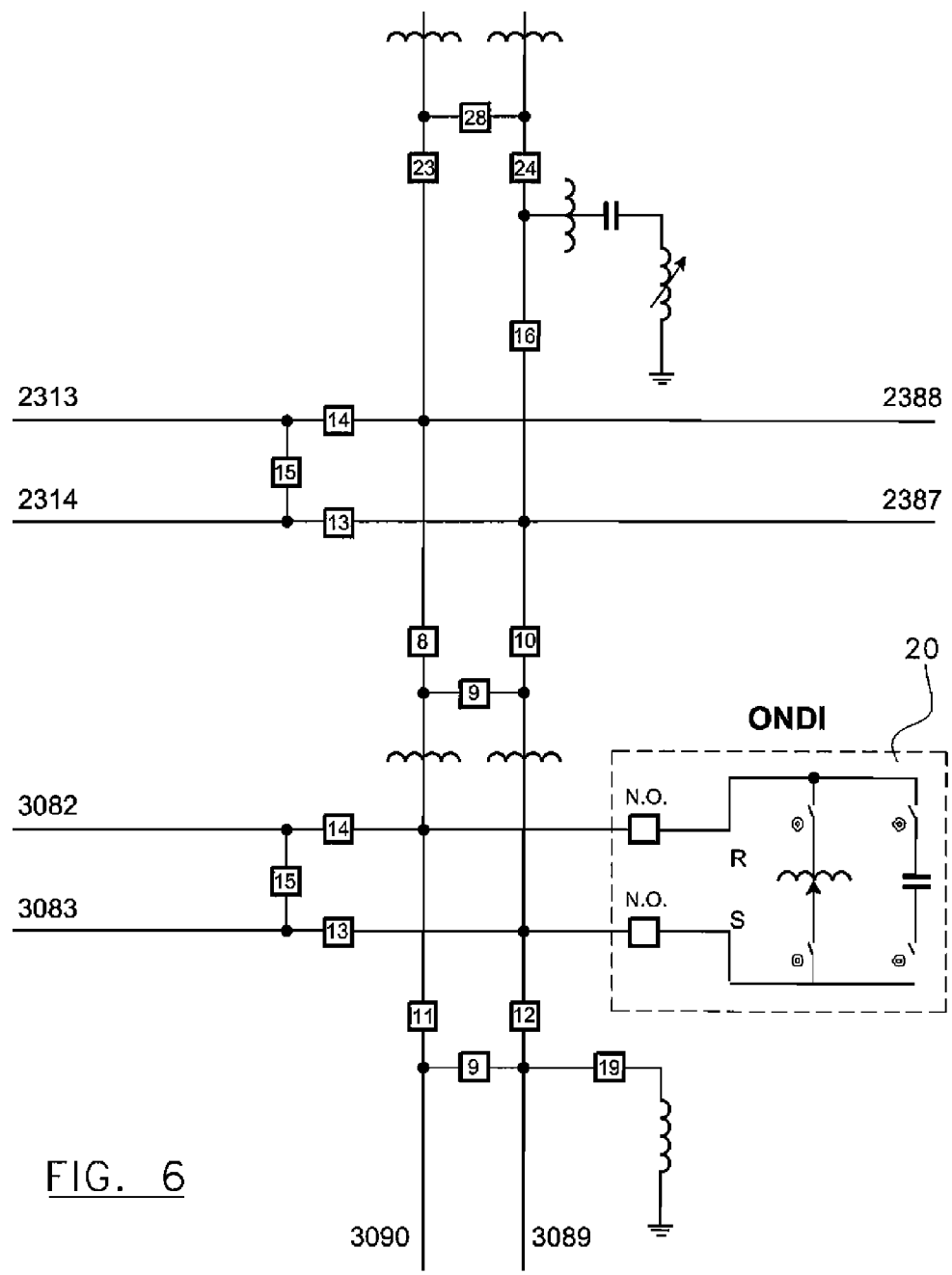
FIG. 6 is a schematic diagram showing a connection of an energized line de-icer in accordance with the invention with a set of 315 kV buses of a target substation.

In FIG. 6, the single-line diagram of the APST at the target substation, capable of serving as an ONDI 20, is shown.

It should be highlighted that for the two types of APSTs, the behaviour of the PST is relatively unaffected by putting the reactive element in parallel because the impedance of this element is much greater than the leak impedance of the PST, which is where the term "assisted phase shifting transformer" comes from.

Figure 7:
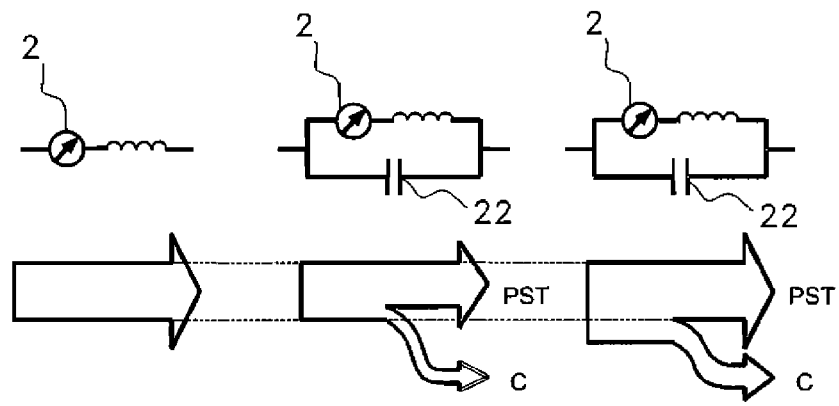
FIG. 7 is a schematic diagram showing power flow increase by conversion of a phase shifting transformer into an assisted phase shifting transformer, in accordance with the present invention.

In reference to FIG. 7, a schematic shows the capacitor 22 assisting the PST 2 that is working as a power regulator. Firstly (to the left in the Figure), it can be seen that after adjusting the tap changer of the PST 2, the wheeling level in the line was able to be increased to a certain level. As was mentioned before, a voltage must be imposed by the PST in order to produce the angular offset at its terminals. In the case of power gain, the imposed voltage is such that if a capacitor 22 is put in parallel with the PST 2, a part of the current in the line is found to be diverted by the capacitor 22. Studies of secondary-transmission of power show that when the wheeling in the line varies little while it decreases greatly in the PST 2 (in the middle of the Figure), it is able to heat less.

It thus becomes possible to readjust the tap changer of the PST 2 in order to newly increase its current to its rated value. Doing this, the current also increases in the capacitor 22, and contributes to increasing the power wheeled by the line (to the right in the Figure).

Thusly, with a PST with a given rated power, the conversion into an APST enables increasing the wheeling in the line above the thermal limit of the PST. In one application which requires a PST having a large angular range, as is the case for the de-icing of long lines, it is therefore possible to use a PST that is much smaller if it is assisted by a reactive element than if it was used alone. This is illustrated in FIGS. 8 to 13.

It should be highlighted that the APST with capacitor presents a very important particularity for de-icing. The more the imposed voltage increases, the more the reactive power of the capacitor submitted to this voltage increases. Thus, the capacitor's reactive power production is found to increase in the same direction as the reactive power needs of the grid. During a de-icing operation, the power wheeled by the lines greatly exceeds its habitual levels, which normally results in the collapse of voltages in the grid. The APST, by its production of reactive power, is able to avoid such voltage collapse and the grid is able to maintain adequate voltages for supplying charge during de-icing.

If the de-icing of lines was to be performed using nothing but PST technology, the question of dimensioning the latter would be relatively simple. A set of load distribution calculations would have to be performed in order to identify the most stressful operating conditions. In the case of the APST, the question of dimensioning becomes more complex because there is an additional degree of freedom: the choice of capacitor impedance.

Four main factors are implicated in the choice of this impedance: the cost of the APST (when the rated power of the capacitor increases, that of the PST decreases and vice versa); the impedance of the de-icing loop; the resonance mode frequency introduced by the capacitor of the APST; and the voltage support to the grid during de-icing.

A method of analysis of the power regulators (PST, APST, UPSC (Unified Power Flow Controller) or others) in the angle δsr-power P plane has been developed. With this method, the interaction between a power regulator and the grid in which it is placed can be expressed quite easily. This method is used here to graphically illustrating the operation of the ONDI. In the following lines, the main aspects of this method are outlined.

Figure 8A:
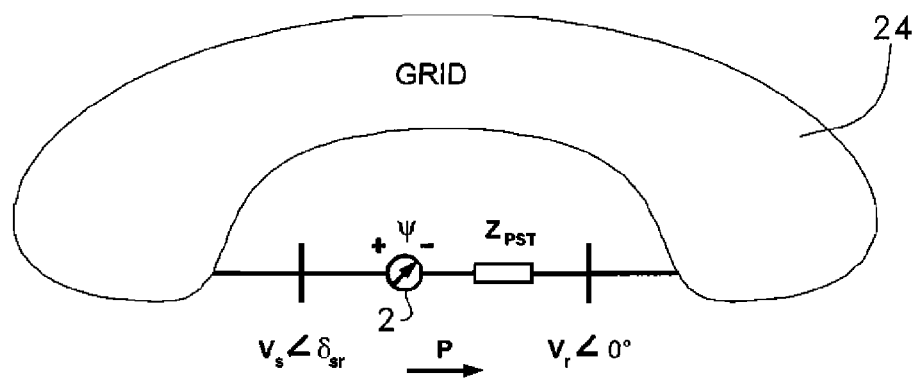
FIGS. 8A-B are respectively a schematic diagram of a grid and a diagram showing a P-$\delta_{sr}$ plane in accordance with the present invention.
Figure 8B:
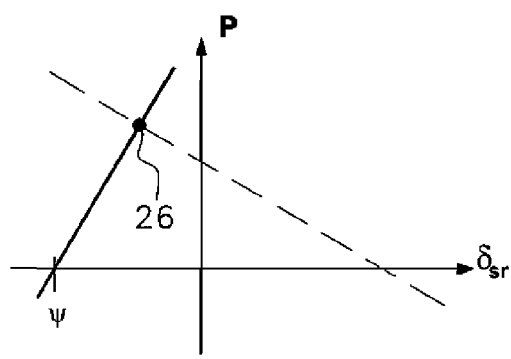

Referring to FIGS. 8A-B, the P-δsr method enables considering the grid 24 in its entirety, regardless of its complexity. The analysis of the combined behaviour of the grid and its power regulator, here a PST 2, is accomplished by observing the regulator's wheeled power P as a function of the angular difference δsr at its terminals. These two sizes are used in order to define the P-δsr plane as illustrated in FIG. 8B.

Two types of relatively linear characteristics, which are also decoupled one from the other, are defined in the P-δsr plane: the grid characteristic 24 depends relatively little on the type of power regulator (it is principally a function of the impedance of the grid and of its mode of operation); of regulator characteristic, which depends relatively little on the grid 24 (it is principally a function of the regulator parameters).

The intersection of these two characteristics gives the point of operation 26 of the grid-power regulator assembly. For a given grid, the effects that would be obtained regarding the dimensioning of the regulator can be illustrated in a simple way if one or the other of the parameters of the grid or regulator is modified.

Figure 9:
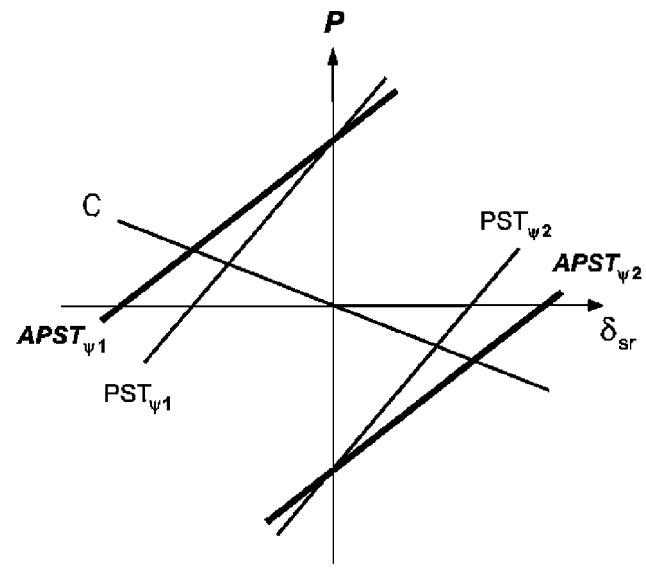
FIG. 9 is a diagram showing characteristics of an assisted phase shifting transformer for two internal angle values, in accordance with the present invention.

FIG. 9 displays an example of modifying a PST parameter. This Figure shows how the PST characteristic (in thin lines) is modified by putting a capacitor in parallel to form an APST (in bold lines). Since the capacitor is in parallel, the power that it holds can be directly added to that of the PST to obtain the APST characteristic (in bold lines). This addition of the characteristics for two different interval angles ψ is illustrated. In expectation of what will follow, it should be mentioned that the smaller the impedance of the capacitor, the more its characteristic has a negative slope.

Figure 10A:
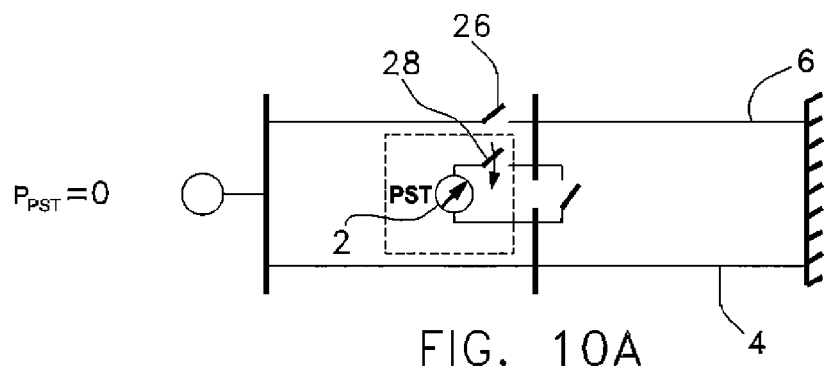
FIGS. 10A-B are schematic diagrams showing two methods for putting a phase shifting transformer in service, in accordance with this present invention.
Figure 10B:
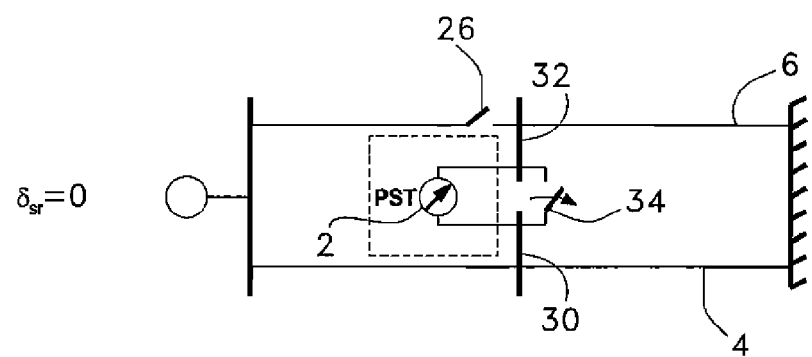

FIGS. 10A-B respectively illustrate two methods by which the activation of a ONDI can be achieved. Again, the example of a PST 2 is used.

According to the first method illustrated in FIG. 10A, just before the activation of the PST 2, the grid is configured in order to create a concentration of charging current on the lines to be de-iced 4,6 (the line 4 in the Figure). This concentration of charge is achieved uniquely by manoeuvring the circuit breaker 26 of the grid. Subsequent to this, the internal angle of the PST 2 is pre-adjusted to the same value as the angle δ-sr measured at its terminals. In this way, upon closing the circuit breaker 28 of the PST 2, the impact of the PST 2 on the wheelings of the grid is minimal; the value of $P_{PST}$ remains weak, near zero.

In a real situation, it may be necessary to maneuver many circuit breakers in order to obtain the effect of charging current concentration in a given line. It is worthy to note, in passing, that the concentration of de-icing current facilitates increasing the de-icing, but does not constitute an indispensable condition to the ONDI's operation. One is able to resort to the concentration of charging current in order to reduce the size of the ONDI. The current of the ONDI is therefore approximately equal to the de-icing current reduced from the contribution of the charging current.

In the case where the line momentarily left in antenna configuration is long (line 6 in the Figure), this method presents the inconvenience of producing an over-voltage in the latter due to the Ferranti effect. This difficulty is overcome with the second method.

Referring to FIG. 10B, while the two busses 30, 32 of the PST 2 are short-circuited by the circuit breakers 34 of the grid, the internal angle ψ is adjusted to zero degrees and then the PST 2 is activated. The angle σsr at the terminals of the PST 2 is zero. Subsequently, the grid is configured in anticipation of concentrating the charging current as before (e.g. by operating the circuit breaker 26 of the grid). Finally, the circuit breaker 34 short-circuiting the PST 2 is opened.

In this way, the lines to be de-iced 4,6 are in antenna configuration. On the other hand, depending the operating conditions, the readjustment of the wheelings at the moment of inserting the PST 2 can be more important than with the first method.

Figure 11A:
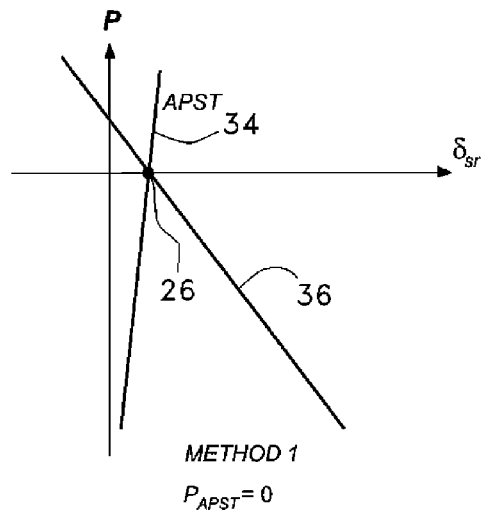
FIGS. 11A-B are diagrams showing P-$\delta_{sr}$ planes in accordance with the respective methods of putting the invention in service, in accordance with the present invention.
Figure 11B:
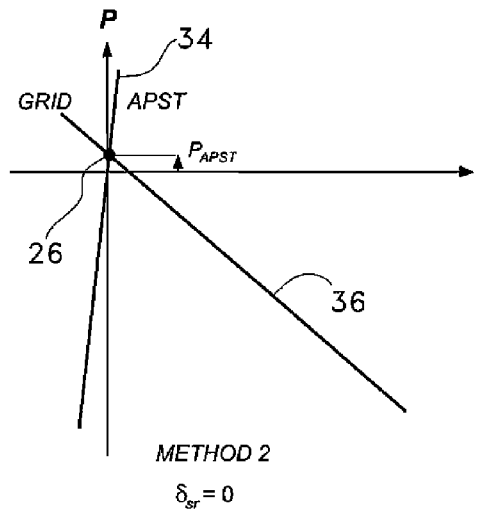

FIGS. 11A-B show the differences between these two methods in the P-δsr plane (FIG. 11A for the first method, FIG. 11B for the second method). The operational points 26 illustrated thereon correspond to the state of the grid and of the ONDI in APST mode after its activation. While these schematics are qualitative, they represent quite closely a translation of the results obtained during the simulations of the activation of the ONDI for line de-icing at 315 kV.

Once the ONDI is in service, there remains nothing but to vary the tap changer of the PST 2 to vary the imposed voltage and, in consequence, the internal angle ψ. In the P-δst plane, this variation of the internal angle is translated by the lateral sliding of the ONDI characteristic 34 (in an APST mode for this example). Doing this, the intersection 26 of the ONDI characteristic 34 and of the grid characteristic 36 will slide along the grid characteristic 36. It is by making the regulator characteristic 34 slide to the right that the operating conditions shown in FIGS. 11A-B become the conditions of FIGS. 12A-B under a de-icing condition.

With the help of the P-δsr plane, an example of the compromise achieved by dimensioning the capacitor and the PST of the APST can be seen.

Figure 12A:
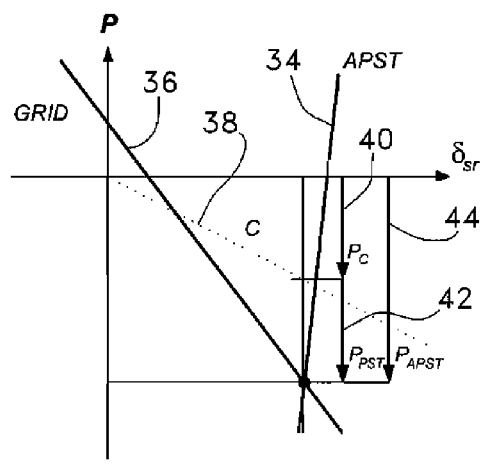
FIGS. 12A-B are diagrams showing P-$\delta_{sr}$ planes and choice of capaciter of an assisted phase shifting transformer, depending on the lines to be de-iced.
Figure 12B:
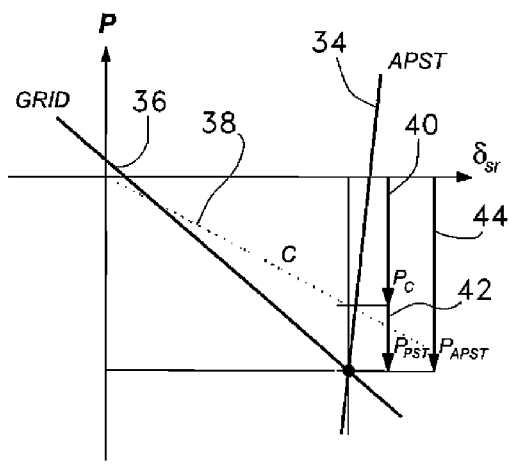
Figure 13A:
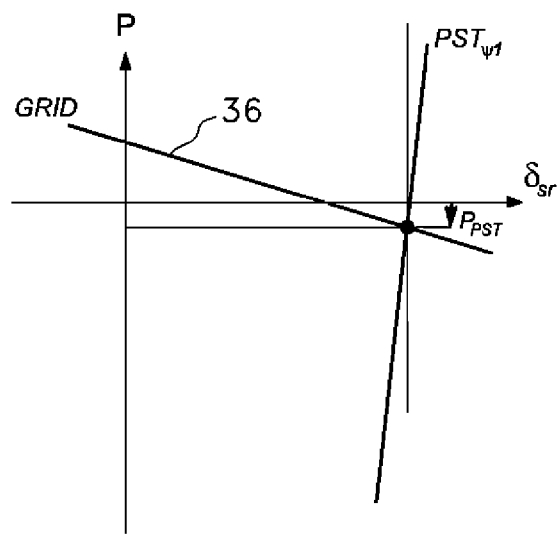
FIGS. 13A-B are diagrams showing P-$\delta_{sr}$ planes during line de-icing in phase shifting transformer mode and in assisted phase shifting transformer mode respectively, in accordance with the present invention.
Figure 13B:
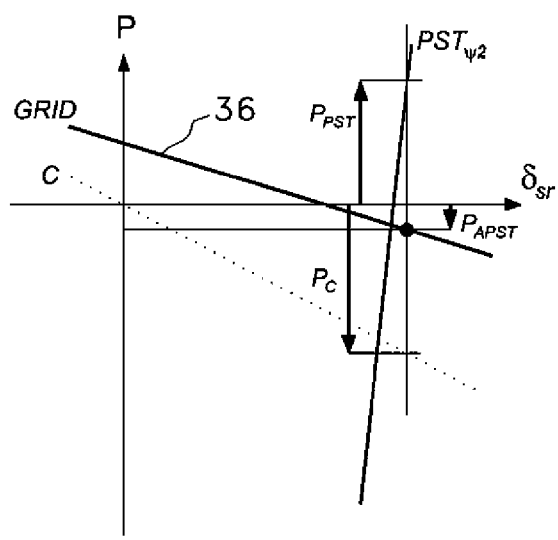

FIGS. 12A-B give the conditions of de-icing lines at 315 kV joined to the target substation. On each of the planes, the grid characteristic 36, the capacitor characteristic 38, and the APST characteristic 34 are found. The arrows 40, 42, 44 qualitatively show the active power levels in the capacitor, the PST and the APST, respectively. As was mentioned here above, the sum of the power of the capacitor and of the PST gives that of the APST. As was shown in FIGS. 11A-B, these schematics faithfully represent the simulation results.

By comparing the de-icing of lines 3082 and 3083 (FIG. 6 and FIG. 12A) with that of lines 3089 and 3090 (FIG. 6 and FIG. 12B), it may be noted that, in the first case, the power 40 wheeled by the capacitor is approximately equal to that 42 of the PST. In the second case, however, the power 40 held by the capacitor is approximately double that 42 of the PST. In the first case, the power 42 wheeled by the PST is greater, whereas in the second case the power 40 wheeled by the capacitor is greater.

It is important to highlight in passing to what point the APST is well adapted to de-icing transport lines. In fact, the two cases in FIGS. 12A-B show that the rated power of the PST required for controlling the de-icing current is in the order of half of the rated power of an equivalent PST able to produce on its own, without the capacitor, the same de-icing current.

In order to reduce the cost of the PST, it is possible to reduce the value of the impedance of the capacitor in such a way as to make the wheeling of the latter the greatest possible, and, inversely, the wheeling of the PST the weakest possible. Doing this increases the size and the cost of the capacitor.

It can be shown that the slope of the grid characteristic depends on the sum of the impedances of the de-icing loop elements; the slope is inversely proportional to this sum.

In the case where a grid of a region where de-icing is desired for lines at 230 kV to 315 kV, this implies that the slope of the grid characteristic will vary considerably depending on the lines to be de-iced. The slope of the grid characteristic will be steeper when lines at 315 kV are de-iced. The slope will decrease considerably when lines at 230 kV are de-iced. The variation of the slope of the grid characteristic can be appreciated by comparing FIGS. 12A-B with FIGS. 13A-B, which are at the same scale. The marked reduction in the grid characteristic 36 at 230 kV (FIGS. 12A-B) can be explained by the mechanical construction of the lines (structure and length) and also by the presence of two transformers 315/230 kV in series in the loop.

This decrease in slope of the grid characteristic 36 has an impact on the choice of de-icing mode. For the particular case presented here, one may be directed to retain the APST mode (FIGS. 12A-B) for lines at 315 kV and the PST mode (FIG. 13A) for lines at 230 kV. The PST required at 315 kV presents a rated power sufficient to be used alone for de-icing lines at 230 kV.

The capacitor of the APST does not introduce a synchronous mode like classic series compensation because its impedance is too high for the latter. Typically, this mode of resonance is super-synchronous.

For the reference example, the capacitor of the APST displays a reactance of 159 Ω. It introduces a resonance mode of which the frequency varies with the leakage impedance of the PST.

When the APST is on the point of being activated, by proceeding in accordance with the first method described here above ($P_{APST}=0$), the capacitor is in parallel with the leakage impedance of the PST only. Supposing that the maximum value of this leakage impedance varies between 5 and 10% at the base of the PST (from ψ minimum to ψ maximum), an impedance being able to vary between 11.5 to 23 Ω was obtained when the internal angle was zero or its maximum. Under these conditions, the frequency of resonance varies between 223 and 158 Hz respectively.

One must insure that this resonance frequency remains sufficiently elevated in order to put the APST in service in accordance with the first method. With the parameters that were used, the power distribution calculations show that the internal angle ψ of the PST can be varied between ±30° without having the current flow between the PST and is capacitor going over the rated current of the PST.

Other operating conditions can have an impact on the choice of capacitor. As an example, if the APST de-ices a line while its internal angle is near its maximum value and the loop opens for one reason or another, important overvoltages can occur at the terminals of the APST and elsewhere in the grid, depending on the topology of the latter. If this happens, the choice of capacitor can be reviewed or protection elements such as lightning conductors can be considered for assuring the integrity of the grid.

The ONDI at the target substation can be principally composed of four parts: a phase shifting transformer; a capacitor bank; two circuit breakers; and two motorized section switches.

Lightning arresters should be used in order to protect the capacitors from the shocks coming from lightning and over-voltages, if required.

The electric characteristics are specific to the target substation and are given here by way of example only.

FIG. 16 is a table giving the SR powers as a function of the external and internal angles of the PST. We used a series impedance of 10% evaluated on the basis of the PST rated power.

The maximum power of the PST is 443 MVA when the internal angle measures 43°. However, the power of the PST does attain only 251 MVA when the internal angle measures 60°. The internal angle can vary between −60° and 60° depending on the de-icing conditions.

In light of these results, we can specify, as a follow up, the main characteristics of the PST: 450 MVA at an ambient temperature of 0° C. and an internal angle of 45°; 250 MVA at an ambient temperature of 0° C. and internal angle of 60°; rated phase-phase voltage of 315 kV; an approximate series impedance of 10% at the maximum tap; three angular ranges: −60° to 0°, 30° to 30°, and 0° to 60°; the tap changer must enable the coverage of each of the ranges without interruption; a maximum of four degrees per tap.

The principal characteristics of the capacitor of the ONDI are the following :a total of 465 Mvar (3×155 Mvar) at an ambient temperature of 0° C.; rated voltage of 157 kV; reactance of 159 Ω; and a ground-phase rated insulation of the two terminals of the capacitors of 315/3 kV.

As well as for transmission, the ONDI can perform de-icing of three phase distribution lines.

Depending on the physical characteristics of the distribution lines to be de-iced, an ONDI of type PST or APST can be used. The maximum length of the loops formed by the distribution lines depends on the characteristics of the lines. The PST used alone enables de-icing of relatively short loops, e.g. of 0 to 30 km approximately. Thanks to the voltage support provided by the capacitor of the APST, the latter can de-ice lines of approximately 0 to 60 km.

The currents and the voltage levels required for de-icing distribution lines are much lower than these required for transport lines in such a way that the rated power of an ONDI for distribution lines is much weaker than that for transport lines. For this reason, it is possible to conceive of a mobile ONDI installed on a platform. Such an apparatus can thus be conceived for de-icing many circuits of lines. In preparation for an ice storm, or ice rain, the apparatus is transported and then attached to the endangered lines. Transportability constitutes a very important asset for maximizing the economic value of the apparatus.

Figure 14A:
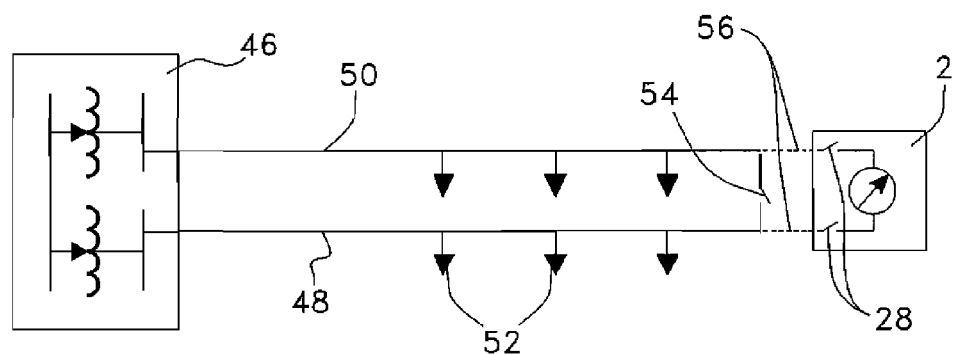
FIGS. 14A-C are schematic diagrams showing examples of connections of an energized line de-icer of the type in which a phase shifting transformer is in series with a distribution line, in accordance with the present invention.
Figure 14B:
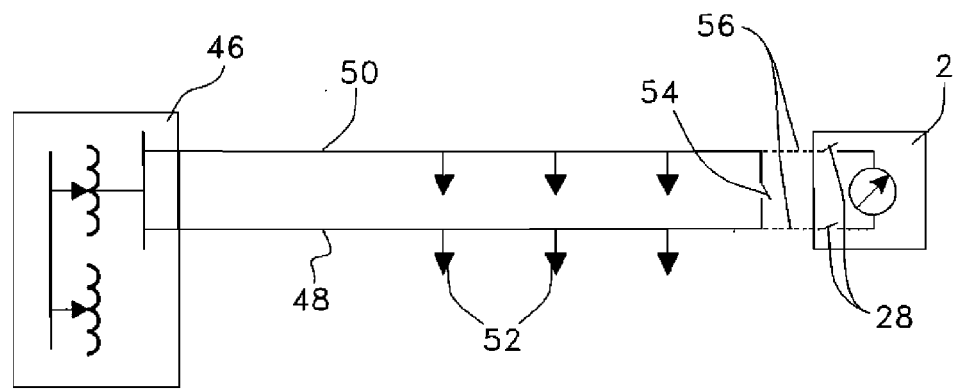
Figure 14C:
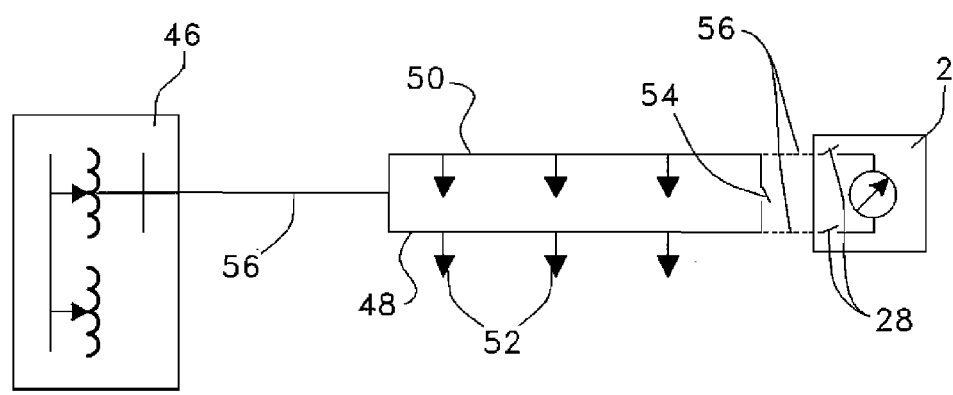

With reference to FIGS. 14A-C, different ways of connecting a mobile ONDI to a distribution line outside a substation are presented. It can be seen on the unitelegraphic schematics of these FIGS., a distribution substation 46, two distribution lines 48,50 and their charges 52. Also shown is an interruptor 54 enabling the lines 48,50 to be connected one to the other at the distribution grid level.

For de-icing the lines of the illustrated schematics in FIGS. 14A-B, the PST 2 must merely be transported to the sectioning point of the loop. Flexible cables 56 are therefore used for connecting the PST 2 to the terminals of the interrupter 54. Following this, it should be made sure that this interrupter 54 is open and then that the tap changer of the PST 2 is regulated in such a way as to introduce a sufficiently elevated current in the loop to enable de-icing. This current is added to the charging current in one of the lines 48, 50 and is substracted from the charging current in the other line 48, 50. Depending on the level of the charging current, it may be necessary to invert the sign of the phase difference of the PST to successively impose in the two lines 48,50 adequate de-icing currents.

The PST 2 is operated in a same way in the case of the unitelegraphic schematic illustrated in FIG. 14C. In this Figure, it is simply indicated that the loop current does not necessarily pass by the substation 46. The loop to be de-iced can be connected in an antenna configuration to the distribution substation 46 by a cable or an aerial line 56 that is reinforced for ice rain.

Figure 15:
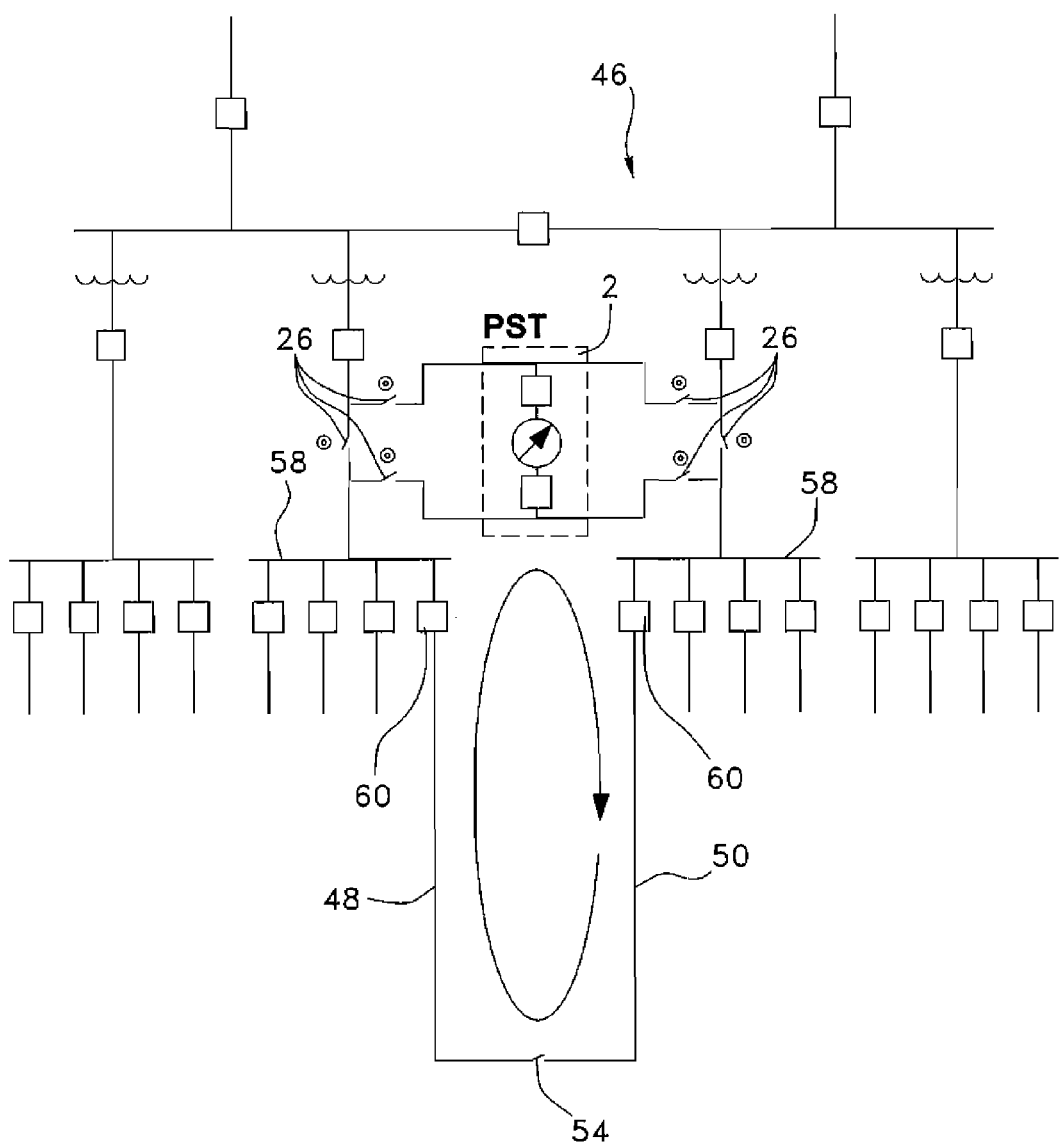
FIG. 15 is a schematic diagram showing an example of a connection of an energized line de-icer of the type in which a phase shifting transformer is at the level of a secondary-transmission substation, according to the present invention.

With reference to FIG. 15, another example of the use of an ONDI, fixed or mobile, for de-icing distribution lines 48, 50 is presented. Here again, a PST type ONDI is shown. This PST is attached directly to the set of buses 58 of the substation 46 in such a way as to have access to all the distribution lines connected to the substation. Using adequate manipulation of the circle breakers, interrupters 54 and section switches 60, the ONDI is connected in series with the lines to be de-iced 48, 50.

Although embodiments of the invention were illustrated in the drawings and described here above, it is obvious for someone skilled in the art that changes and modifications can be brought to these embodiments without deviating from the essence and spirit of the invention.

For example, a variant of the assembly illustrated on FIG. 15 would be to replace at least one of the power transformers of the substation 46 by a transformer that would be, at the same time, a step down and phase shifting transformer. As far as interruptors are available in the distribution grid for forming loops, this ONDI would enable the flow of current for de-icing following an approach very similar to that shown in FIG. 15.

Another variant of ONDI could consist in simply installing a Y-Delta type series transformer for producing a fixed regular offset of 30 degrees. This very simple approach would permit the de-icing of lines as long as the impedance of these lines permitted a sufficient current for de-icing the conductors to be obtained without over heating the connectors, sections switches, cables or other apparatus in series in the de-icing loop. One could also foresee installing other types of transformers that offer an angular offset specially calculated for de-icing one or several lines in particular.

The invention claimed is:

1. A method of de-icing energized electric lines of an alternating current voltage distribution or transmission network comprising the steps of:
   providing an apparatus capable of producing an adjustable angular offset between voltages at its terminals;
   selecting segments of the energized electrical lines to be de-iced;
   connecting the segments to form a loop by selectivly operating circuit breakers of the network;
   connecting the apparatus in series with the segments of the loop to be de-iced;
   activating the apparatus;
   adjusting the angular offset of the apparatus to impose an increase in current flowing in at least one of the segments of the loop, thus causing the de-icing of said at least one of the segments of the loop wherein the apparatus further comprises a circuit breaker and further comprising the steps of:
   measuring a phase displacement at the terminals of the apparatus;
   adjusting an internal angle of the apparatus to a same value of the phase displacement measured; and
   operating the circuit breaker of the apparatus into a closed position.

2. The method of de-icing according to claim 1, wherein the apparatus comprises a phase shifting transformer provided with a tap changer for adjusting the angular offset.

3. The method of de-icing according to claim 2, wherein the apparatus comprises a capacitor in parallel with the phase shifting transformer.

4. The method of de-icing according to claim 1, further compromising:
   operating a line circuit breaker on one of the segments of the loop into an open position for concentrating charging current in the other segment of the loop.

5. The method of de-icing according to claim 1, wherein the apparatus is mobile and the distribution lines are connectable to a sectioning point by means of an interruptor having opposite terminals, the terminals of the apparatus being connected to the terminals of the interruptors, the interruptors, the interruptor being operated into an open position during de-icing.

6. The method of de-icing according to claim 1, wherein the apparatus is connected with the segments of the loop by an interrupting clement, the apparatus being connected in circuit with the loop by operating the interrupting element.

7. The method of de-icing according to claim wherein the interrupting element comprises an interruptor.

8. The method of de-icing according to claim 6, wherein the interrupting element comprises a circuit breaker.

9. The method of de-icing according to claim 1, wherein the apparatus is mobile and the distribution lines are connectable to a sectioning point by means of an interruptor having opposite terminals, the terminals of the apparatus being connected to the terminals of the interruptors, the interruptor being operated into an open position during de-icing.

10. A method of de-icing energized electric lines of an alternating current voltage distribution or transmission network comprising the steps of:
    providing an apparatus capable of producing an adjustable angular offset between voltages at its terminals;
    selecting segments of the energized electrical lines to be de-iced;
    connecting the segments to form a loop by selectivly operating circuit breakers of the network;
    connecting the apparatus in series with the segments of the loop to be de-iced;
    activating the apparatus;
    adjusting the angular offset of the apparatus to impose an increase in current flowing in at least one of the segments of the loop, thus causing the de-icing of said at least one of the segments of the loop;
    adjusting an internal angle of the apparatus to a value of zeroes;
    operating a circuit breaker connected between the segments of the loop in a closed position to short-circuit the apparatus;
    operating a line circuit breaker on one of the segments of the loop into an open position for concentrating a charging current in the other segment of the loop; and
    operating the circuit breaker connected between the segments of the loop in an open position.

11. The method of de-icing according to claim 10, wherein the apparatus is connected with the segments of the loop by an interrupting element, the apparatus being connected in circuit with the loop by operating the interrupting element.

12. The method of de-icing according to claim 9, wherein the interrupting element comprises an interruptor.

13. The method of de-icing according to claim 9, wherein the interrupting element comprises a circuit breaker.

* * * * *